United States Patent
Krivit et al.

(10) Patent No.: US 11,323,537 B1
(45) Date of Patent: May 3, 2022

(54) GENERATING EARLY HINTS INFORMATIONAL RESPONSES AT AN INTERMEDIARY SERVER

(71) Applicant: CLOUDFLARE, INC., San Francisco, CA (US)

(72) Inventors: Alex Krivit, Edwards, CO (US); Rustam Xing Lalkaka, San Francisco, CA (US); Samantha Aki Shugaeva, Palo Alto, CA (US); Edward H. Wang, Oakland, CA (US); Yuchen Wu, Pacifica, CA (US)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

(21) Appl. No.: 17/476,262

(22) Filed: Sep. 15, 2021

(51) Int. Cl.
*H04L 29/08* (2006.01)
*H04L 67/5681* (2022.01)

(52) U.S. Cl.
CPC .............................. *H04L 67/2847* (2013.01)

(58) Field of Classification Search
None
See application file for complete search history.

(56) References Cited

U.S. PATENT DOCUMENTS

| | | | | |
|---|---|---|---|---|
| 9,241,044 B2* | 1/2016 | Shribman | ........... | H04L 67/2838 |
| 2013/0179545 A1* | 7/2013 | Bishop | .............. | H04L 29/08072 |
| | | | | 709/219 |
| 2014/0281918 A1* | 9/2014 | Wei | .......... | H04L 67/02 |
| | | | | 715/234 |
| 2015/0067819 A1* | 3/2015 | Shribman | ............. | H04L 63/029 |
| | | | | 726/12 |
| 2015/0134734 A1* | 5/2015 | Bishop | .................. | H04L 67/303 |
| | | | | 709/203 |
| 2019/0116243 A1* | 4/2019 | Shribman | ........... | H04L 65/4084 |
| 2019/0132417 A1* | 5/2019 | Shribman | ........... | H04L 65/4084 |
| 2019/0349449 A1* | 11/2019 | Shribman | ............. | H04L 63/029 |
| 2020/0351378 A1* | 11/2020 | Shribman | ............... | H04L 67/02 |
| 2021/0194986 A1* | 6/2021 | Shribman | ........... | H04L 65/4084 |

OTHER PUBLICATIONS

K. Oku, et al., An HTTP Status Code for Indicating Hints, Internet Engineering Task Force (IETF), Request for Comments: 8297, Dec. 2017, 7 pages.

(Continued)

*Primary Examiner* — Ranodhi Serrao
(74) *Attorney, Agent, or Firm* — Nicholson De Vos Webster & Elliott LLP (57) ABSTRACT

An intermediary server determines, for an asset handled by an origin server, piece(s) of content for inclusion in link header field(s) in an informational response that signifies that the piece(s) of content are predicted to be linked within a final response for the asset. The intermediary server generates an informational response that includes the link header field(s) and responds to a request from a client with the informational response. The intermediary server transmits the request to the origin server. The intermediary server receives the final response to the request from the origin server, and transmits the final response to the client.

18 Claims, 4 Drawing Sheets

(56) References Cited

OTHER PUBLICATIONS

Betts, Towards ever faster websites with early hints and priority hints, Fastly Inc., Jun. 13, 2018, 9 pages, downloaded at: https://www.fastly.com/blog/faster-websites-early-priority-hints.

Nottingham, Beyond Server Push: experimenting with the 103 Early Hints Status Code, Fastly Inc., Nov. 4, 2020, 7 pages, downloaded at: https://www.fastly.com/blog/beyond-server-push-experimenting-with-the-103-early-hints-status-code.

Bilcke, 103 Early Hints, Jun. 30, 2018, 6 pages, downloaded at: https://evertpot.com/http/103-early-hints.

Williams, Early Hints and HTTP/2 Push with Falcon, Feb. 10, 2019, 4 pages, downloaded at: https://www.codeotaku.com/journal/2019-02/falcon-early-hints/index.

* cited by examiner

GENERATING EARLY HINTS INFORMATIONAL RESPONSES AT AN INTERMEDIARY SERVER

FIELD

Embodiments of the invention relate to the field of networking; and more specifically, to generating early hints informational responses at an intermediary server.

BACKGROUND

An "early hints" status code is an informational HTTP status code in non-final HTTP responses that provides hints that certain resource(s) may appear in the final response. The early hints status code is defined in Request For Comments (RFC) 8297, titled "An HTTP Status Code for Indicating Hints," dated December 2017. The early hints status code has been given the number 103. The 103 status code is designed to speed up overall page load times by giving the client an early signal that certain assets may appear in the final response. For instance, after receiving the 103 response, a client can start to fetch the resource(s) indicated in that response before the final HTTP response is received. During this time, the server may be compiling the final response including authenticating the request, making API calls, accessing a database, etc.

Other techniques for conveying this information to the client, such as by using a "preload" link relation, typically cannot be performed by the server until the full HTTP response header is determined. In contrast, a server can send a 103 informational response that includes links to help the client prepare for processing the final response before receiving the full HTTP response.

SUMMARY

An intermediary server responds to a request for an asset handled by an origin server with an informational response. The informational response indicates a set of link header field(s) that reference a set of piece(s) of content that are predicted to be linked within the requested asset when served by the origin server in the final response. The informational response may be generated without the origin server transmitting such an informational response. The generation of these informational responses may be based on analyzing prior full response(s), analyzing a request log, characteristic(s) of the request, characteristics of the potential assets to include in the link header field(s), analyzing other early hints responses, analyzing prior early hints responses from the origin server, and/or configuration by the domain owner. The intermediary server responds to a subsequent client request for the asset with the generated informational response. The requesting client may use the informational response to start fetching the linked resources and/or otherwise prepare for processing the full response. The intermediary server also asynchronously transmits the request to the origin server for the asset. After receiving the full response from the origin server, the intermediary server transmits the full response to the requesting client. The intermediary server uses the full response to determine whether to update or purge the information for the generated informational response for responding to future requests.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

An intermediary server generates an informational response that indicates a set of one or more link header fields that reference a set of one or more pieces of content that are predicted to be linked within a requested internet asset (e.g., an HTML document) when served by the origin server. This informational response may be generated without the origin server transmitting such an informational response. Upon receiving a request for the asset, the intermediary server responds to the request with the generated informational response and asynchronously transmits the request to the origin server for the requested asset. After receiving the full response from the origin server, the intermediary server transmits the full response to the requesting client. The intermediary server uses the full response to determine whether to update or purge the information for the generated informational response for responding to future requests.

Generating this informational response can improve the loading time of the page by providing an early signal about what linked assets are predicted to appear in the final response. The requesting client can use this time, when it otherwise would have been waiting, to start to fetch the asset(s) indicated in the informational response, prepare certain parts of the displayed page, and/or otherwise prepare for the full response to be returned. This can be done without explicit support for these informational responses on the origin server.

Figure 1:
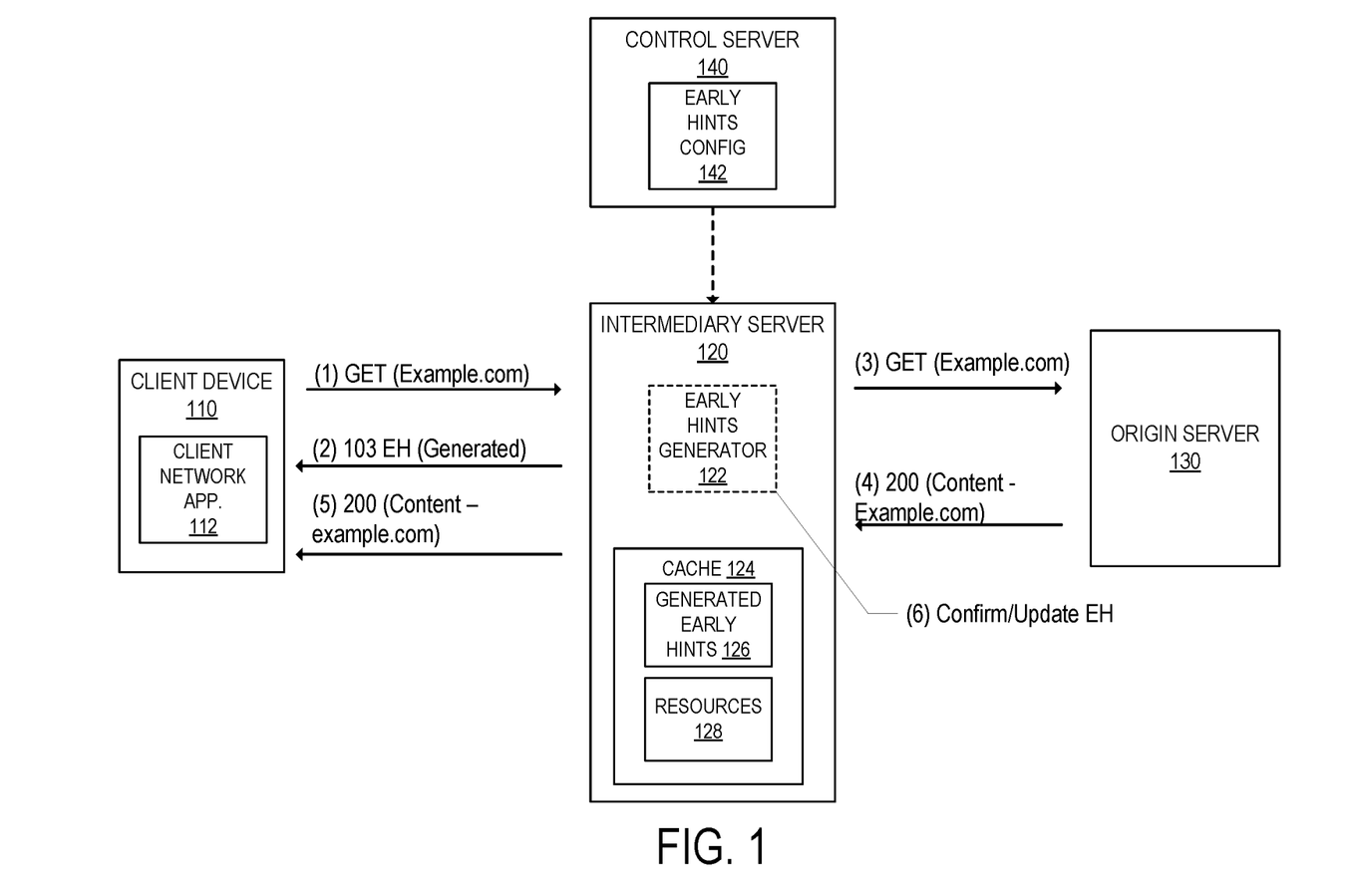
FIG. 1 illustrates an example of a system for generating informational responses that signifies that certain resource(s) are predicted to appear in the final responses according to an embodiment.

FIG. 1 illustrates an example of a system for generating informational responses that signifies that certain resource(s) are predicted to appear in the final responses according to an embodiment. The system includes the intermediary server 120 that is situated between the client device 110 and the origin server 130. The intermediary server 120 may be a reverse proxy server. Certain network traffic is received and processed through the intermediary server 120. For example, web traffic (e.g., HTTP requests/responses, HTTPS requests/responses, SPDY requests/responses, etc.) for a domain handled by the origin server 130 may be received and processed at the intermediary server 120.

The client device 110 is a computing device (e.g., laptop, desktop, smartphone, mobile phone, tablet, gaming system, set top box, internet-of-things (IoT) device, wearable device, or other network device) that is capable of transmitting and receiving network traffic. The client device 110 executes a client network application 112 such as a web browser or other application that can access network resources. In an embodiment, the client network application 112 is capable of processing 103 status code informational responses.

The origin server 130 is a computing device that serves and/or generates network resources (e.g., web pages, images, word processing documents, PDF files, movie files, music files, or other computer files). Although not illustrated in FIG. 1, the network resources handled by the origin server 130 may be stored separately from the device that responds to the requests.

At operation 1, the intermediary server 120 receives a request from the client device 110. The request is a GET request, for example. The request includes one or more request headers that provide information about the request context that can be used by servers to tailor the response. For instance, the request typically includes a user-agent header that specifies the user-agent, operating system, vendor, and/or version of the requesting user-agent. As another example, the request typically includes a host header that specifies the host (the domain name) of the server to which the request is being sent. As another example, the request may also include an accept-language header that indicates the language that the client understands and is preferred. In the example of FIG. 1, the request is a GET request for the document located at example.com.

The intermediary server 120 may receive the request because DNS record(s) for the web property resolve to an IP address of the intermediary server 120 instead of the origin server 130. As another example, the intermediary server 120 may receive the request instead of the origin server 130 because IP address(es) of the origin network are advertised (e.g., using Border Gateway Protocol (BGP)) by the intermediary server instead of being advertised by the origin network. As another example, the client device 110 may be configured to send all traffic to the intermediary server network.

The intermediary server 120 processes the received request. For instance, the intermediary server 120 may access the cache 124 to determine whether the requested resource is available in the cache 124 and/or whether a generated early hint is available in the cache 124 (e.g., the generated early hints 126). If the requested resource is available in cache 124 (e.g., the resources 128), the intermediary server 120 may transmit the requested resource to the client device 110. If the requested resource is not cached in the cache 124, but a generated early hint is available in the cache 124, the intermediary server 120 transmits the generated early hint to the client device 110. For instance, at operation 2 of FIG. 1, the intermediary server 120 transmits an informational response (e.g., a 103 response) that includes one or more link header fields that reference one or more pieces of content that are predicted to be linked within a final response for the requested document. This informational response is sometimes referred herein as an early hints response.

The early hints response may be generated or modified by the intermediary server 120. The early hints response may be generated at the intermediary server 120 without any change to the origin server 130 and/or the resources handled by the origin server 130. For instance, the origin server 130 may not support early hints and/or may not transmit early hints responses for the page, but the intermediary server 120 may generate and transmit the early hints response. As another example, the intermediary server 120 may modify (e.g., remove a link header field, add a link header field) an early hints response that is received from the origin server 130. The early hints response generation can be done automatically and/or with configuration set by the domain owner.

As shown in FIG. 1, the early hints generator 122 generates the early hints response including determining the link header field(s) to include in the early hints response. At least the link(s) of the determined link header field(s) of the generated early hints response is included in the cache 124 (e.g., the generated early hints 126). When a subsequent request is received, the intermediary server 120 uses the information in the generated early hints 126 to respond to the request with an early hints response to the requester. For example, the early hints generator 122 may generate an early hints response with the cached link header field(s). The request may also be transmitted to the origin server 130 to generate the full response.

In an embodiment, the selection of the link header field(s) to include in the early hints response is made based on analyzing prior full response(s), analyzing a request log, characteristic(s) of the request, characteristics of the potential assets to include in the link header field(s), analyzing other early hints responses, analyzing prior early hints responses from the origin server, and/or configuration by the domain owner.

For example, the selection of the link header field(s) for the early hints response may be made at least in part by examining one or more prior responses to similar requests. In an embodiment, a full response may be received from the origin server 130 and parsed to search for link headers with a certain relation type (e.g., preconnect relation, prefetch relation, and/or preload relation types). These link header(s), if any, may be cached in the cache 124 (e.g., the generated early hints 126) and can be used when responding with an early hints response. The link header(s) are not limited to certain relation types. For instance, other links may be selected such as style sheets, client-side scripts, images, etc.

In addition, or in lieu of link relation type, the selection of these link header field(s) is made by parsing prior response(s) and inferring which asserts impact metrics such as the First Contentful Paint or Largest Contentful Paint. For instance, the full response may be rendered in an instance of a client network application at the intermediary server to determine which asset(s) impact these metrics.

In an embodiment, the selection of the link header field(s) for the early hints response may be made at least in part by mining a request log to find asset(s) that have temporal affinity to the requested resource. For instance, the request log may be analyzed to determine asset(s) that are requested within an amount of time after the request for the requested resource. Those asset(s) that have a temporal affinity to the requested resource may be included in the link header field(s) of the early hints response.

In an embodiment, the selection of the link header field(s) for the early hints response may be made at least in part by analyzing the referer header of requests for assets. This may show a direct fetch relationship between the requested resource and the assets that are linked. These asset(s) may be candidates for inclusion in the link header field(s) of the early hints response.

In an embodiment, the selection of the link header field(s) for the early hints response may be made at least in part by identifying assets that have been used in other early hints responses (e.g., for different sites or for different pages on the same site). For instance, if an asset that is linked in the final response has been used in early hints responses for one or more other page(s) (e.g., generated by the intermediary server or generated by the origin), that asset may be included in the early hints response.

In an embodiment, the selection of the link header field(s) for the early hints response may be made at least in part by configuration set by the domain owner. For instance, an interface on the control server 140 may allow the domain owner to specify early hints configuration 142 such as specifying one or more link header field(s) to include in early hints responses for all their pages, or some subset of their pages, and/or link header field(s) to not include in early hint responses for all or some subset of their pages. The configuration may include a maximum amount of link header field(s) that are permitted to be included in any particular early hints response. The configuration may include the type(s) of assets (e.g., style sheets, scripts, images, etc.) that are permitted and/or not permitted in any particular early hints response.

The full response to a request can be different depending on the request context. For example, the same page may be formatted differently for a mobile user-agent as compared to a non-mobile user-agent. In an embodiment, the selection of the link header field(s) for the early hints response can be different for different request characteristics (e.g., information included in the request header and/or inferred from the request) such as user-agent, language, and/or location associated with the request. For example, the selected link header field(s) for a mobile user-agent can be different for the link header field(s) selected for a non-mobile user agent. As another example, the selected link header field(s) for a first language may be different from the link header field(s) selected for a second language. As another example, the selected link header field(s) for a request that is associated with a first geographic location (e.g., a first country or first region)

In an embodiment, the selection of the link header field(s) for the early hints response may be made at least in part by analyzing the characteristics of the potential assets to link in the link header field(s). For instance, some assets may not be loaded by the client even if included in the early hints response. For instance, some clients have their own optimization logic that they will follow regardless of what is included in the early hints response (e.g., load favicons last even if included in an early hints response). As another example, there may be little to no time savings by including some assets in an early hints response.

In an embodiment, the selection of the link header field(s) for the early hints response may be based in part on using client beacons that ping when requests are made to determine asset(s) to include in the early hints response. These pings are received at the intermediary server (or other server of the system) that can be used to determine assets needed to build the page and when they are requested. In an embodiment, the selection of the link header field(s) for the early hints response may be based in part on simulating the request by making the request from an instance of a client network application at the intermediary server to determine assets needed to build the page and when they are requested.

In an embodiment, the early hints generator 122 may determine to include the link header field(s) that are included in a prior early hints response from the origin server 130. For instance, if the intermediary server 120 receives an early hints response from the origin server 130 for this request, the early hints generator 122 may include all, or some, of the link header field(s) included in that early hints response in the response that is being generated. These link headers included in the early hints response from the server may be in addition to the link header field(s) that have been selected by the early hints generator 122. The early hints generator 122 may determine to remove one or more of the link header field(s) that are included in an early hints response from the origin server 130. For instance, if the early hints generator 122 determines that one of the linked assets does not perform well as an early hint (e.g., client network applications are not requesting the linked asset prior to the full response), the early hints generator 122 may remove the corresponding link header field in the generated early hints response. Thus, the early hints generator 122 may modify an early hints response from the origin server 130 to include additional link header field(s) and/or remove certain link header field(s).

As previously described, the intermediary server 120 transmits the early hints response to the client network application 112 at operation 2. The intermediary server 120 also transmits the request to the origin server 130 at operation 3. The request in operation 3 may be the same or similar to the request in operation 1. In the example shown in FIG. 1, the origin server 130 is the origin for example.com and receives the request transmitted in operation 3. The origin server 130 retrieves the requested resource (e.g., example.com) which may include authenticating the request, making API calls, accessing a database, etc. In the meantime, the client network application 112 may start to fetch the resources included in the early hints response and/or otherwise prepare for processing the full response.

In an embodiment, in addition to transmitting the generated early hints response to the requesting client, the intermediary server 120 may fetch those resource(s) indicated in the early hints responses and cache them in the resources 128 (if not already cached). If the intermediary server 120 receives a request for those resources from the requesting client, the intermediary server 120 may respond with a cached version of those resources.

Although FIG. 1 shows the early hints response being transmitted in operation 2 and the request being transmitted to the origin in operation 3, the order of these operations may be swapped. For instance, the intermediary server 120 may transmit the request to the origin server 130 prior to transmitting the early hints response to the client network application 112.

The intermediary server 120 receives the full response from the origin server 130 at operation 4. The full response may have a 200 status code. The intermediary server 120 transmits the full response to the client network application 112 at operation 5.

The content of the generated early hints response may not match the content of the full response. For instance, the content included in the final response may have changed since the early hints response was generated. At operation 6, the intermediary server 120 analyzes the full response to determine if any of the link header field(s) included in the early hints response is not included in the full response. For instance, in an embodiment where the link header field(s) included in the early hints response were selected because they were included in a prior response with a certain relation type (e.g., preconnect, prefetch, and/or preload), the intermediary server 120 compares the relation types in the full response with the cached version. If these links have changed, the intermediary server 120 purges the out-of-date link headers and caches the updated ones.

Figure 2:
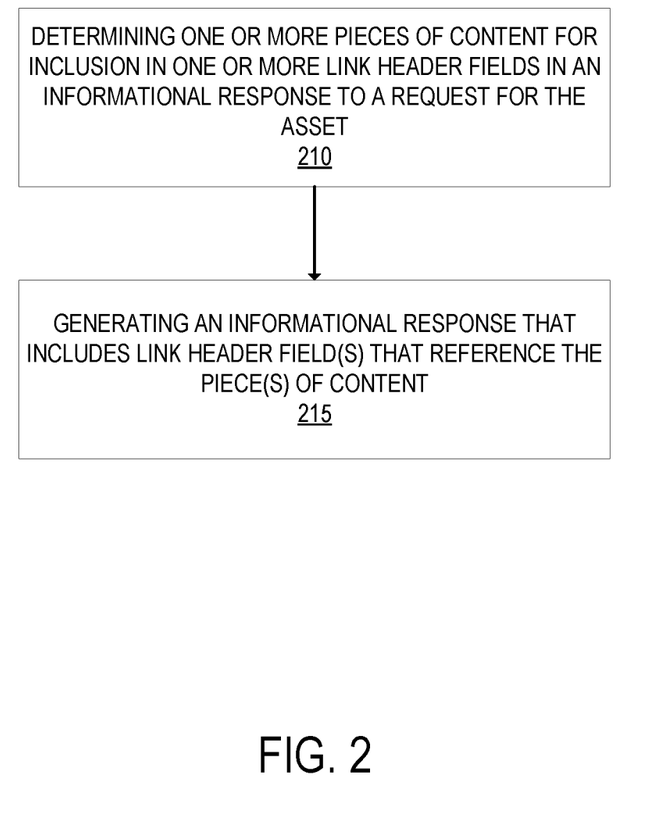
FIG. 2 is a flow diagram that illustrates exemplary operations for generating an early hints response according to an embodiment.

FIG. 2 is a flow diagram that illustrates exemplary operations for generating an early hints response according to an embodiment. The operations of FIG. 2 and other flow diagrams are described with respect to the exemplary embodiment shown in FIG. 1. However, the operations of FIG. 2 and the other flow diagrams can be performed by different embodiments from that shown in FIG. 1, and the embodiment shown in FIG. 1 can perform different operations from those in FIG. 2 and the other flow diagrams.

At operation 210, the early hints generator 122 determines one or more pieces of content for inclusion in one or more link header fields in an informational response to a request for an asset. This informational response indicates that the included link header field(s) may be included in the final response from the origin server 130. In an embodiment, the early hints generator 122 determines the piece(s) of content for inclusion in the link header field(s) based on analyzing one or more prior full responses to the request, analyzing a request log, characteristic(s) of the request, characteristics of the potential assets to link in the link header field(s), analyzing other early hints responses, analyzing prior early hints responses from the origin server, and/or configuration by the domain owner, as previously described. The links for the link header field(s) may be cached at the intermediary server 120 (e.g., in the generated early hints 126 of the cache 124).

Next, at operation 215, the early hints generator 122 generates an informational response that includes the link header field(s) that reference the piece(s) of content. The generated informational response may also be cached at the intermediary server 120. The informational response or the cached links can then be used when responding to a subsequent request for the asset.

Figure 3:
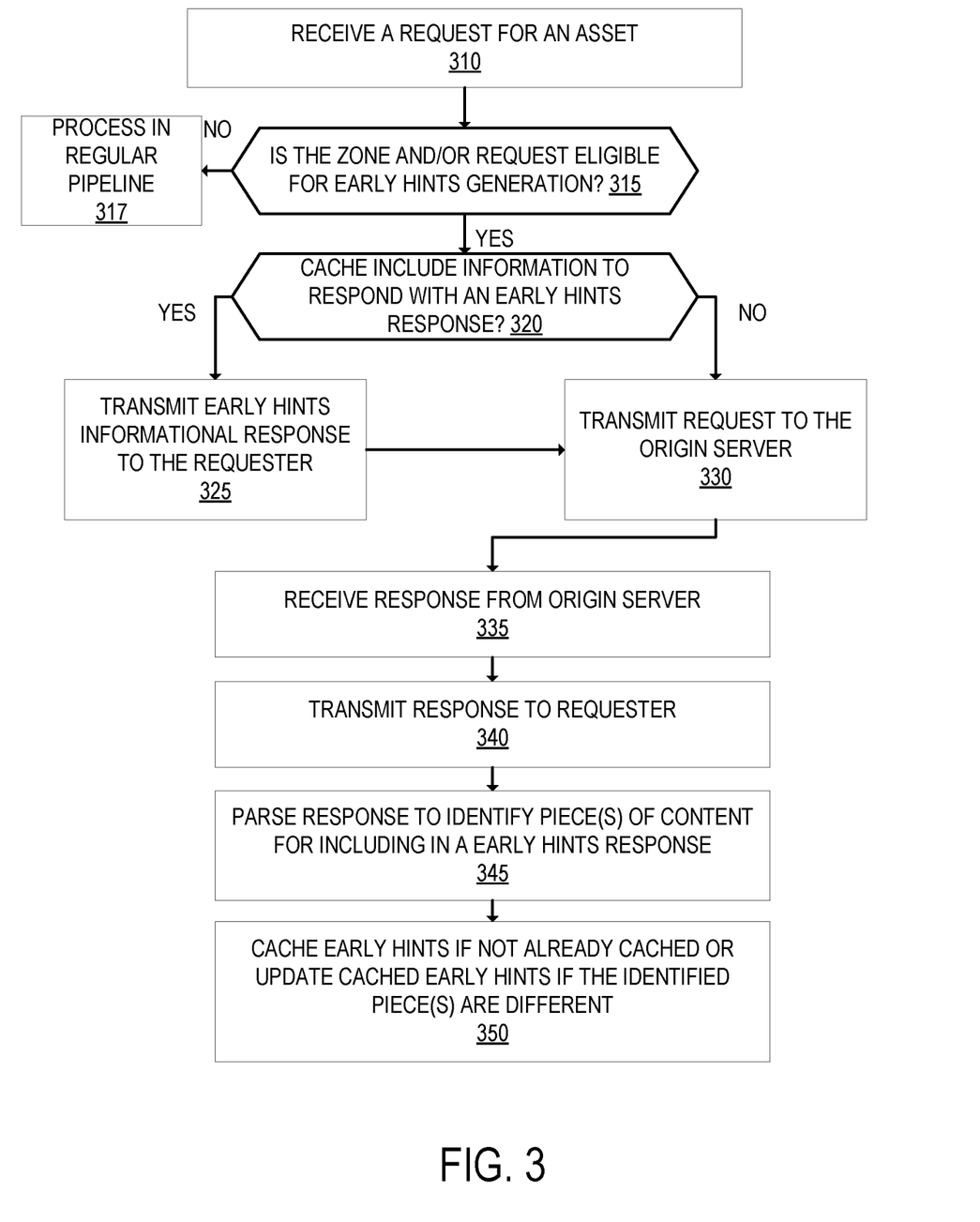
FIG. 3 is a flow diagram that illustrates exemplary operations for using generated informational responses according to an embodiment.

FIG. 3 is a flow diagram that illustrates exemplary operations for using generated informational responses according to an embodiment. At operation 310, the intermediary server 120 receives a request from the client device 110 for an asset that is handled at an origin server 130. The request may be a GET request. The intermediary server 120 may receive the request instead of the origin server because DNS record(s) for the web property resolve to an IP address of the intermediary server 120 instead of the origin server 130. As another example, the intermediary server 120 may receive the request instead of the origin server 130 because IP address(es) of the origin network are advertised (e.g., using Border Gateway Protocol (BGP)) by the intermediary server instead of being advertised by the origin network. As another example, the client device 110 may be configured to send all traffic to the intermediary server network.

Next, at operation 315, which is optional in some embodiments, the intermediary server 120 determines whether the zone and/or request is eligible for early hints generation processing. Some zones may not be configured for early hints generation. In an alternative embodiment, all zones are eligible for early hints generation. Some client network applications may not support processing early hints responses. If the zone is not eligible for early hints generation, or the client network application (e.g., as determined by the user-agent header included in the request) does not support early hints, then operations move to operation 317 where the request is processed in a regular pipeline. For instance, the intermediary server 120 may transmit the request to the origin server 130 and respond to the client device 110 with the full response from the origin server 130. If the zone is eligible for early hints generation, then flow moves to operation 320.

At operation 320, the intermediary server 120 determines whether the cache 124 includes information to respond to the request with an early hints response. The cache 124 may include one or more links for inclusion in an early hints response or a generated early hints response, as previously described herein. If there is such information, then at operation 325 the intermediary server 120 uses the information in the cache to transmit an early hints response to the requesting client device 110. For example, the intermediary server 120 may generate and transmit an early hints response that includes link header field(s) that are cached for the requesting asset. The requesting client device 110 may begin to process the early hints response. Flow then moves to operation 330 where the intermediary server 120 transmits the request for the asset to the origin server 130. If the early hints response for the asset is not available in cache, then operation moves to operation 330.

Sometime after transmitting the request for the asset to the origin server 130, the intermediary server 120 receives a response at operation 335. The intermediary server 120 transmits the response to the requesting client device 110 at operation 340. Next, at operation 345, the intermediary server 120 parses the full response to identify piece(s) of content for inclusion in an early hints response as previously described. Next, at operation 350, the intermediary server 120 caches the link(s) of the identified piece(s) of content if they are not already cached or updates the cached early hints if the identified piece(es) are different. If the identified piece(es) are not different, then the early hints are not updated.

The intermediary server 120 may be part of a distributed cloud computing network that includes multiple nodes that are geographically distributed. Each node may include one or more intermediary servers, one or more control servers, one or more DNS servers, and one or more other pieces of networking equipment (e.g., routers, switches, hubs, etc.). The node may be part of the same physical device or multiple physical devices. For example, the intermediary server(s), control server(s), and DNS server(s) may be virtual instances running on the same physical device or may be separate physical devices. Each node may be part of a data center or a collocation site. The nodes may be geographically distributed that decreases the distance between requesting client devices and content.

Although the early hints generator 122 is shown as being executed on the intermediary server 120 that receives and processes requests and responses, embodiments are not so limited. The early hints generator 122 may be located on a different device. For example, the early hints generator 122 may be located on the control server. In such an embodiment, the generated early hints response may be transmitted to different devices such as the intermediary server 120.

The generated early hints may be shared among the intermediary devices that are part of the same node or from different nodes. For instance, the intermediary server 120 may transmit a generated early hints response to other intermediary devices for storage in their cache and/or to a storage that is available to other intermediary devices.

Figure 4:
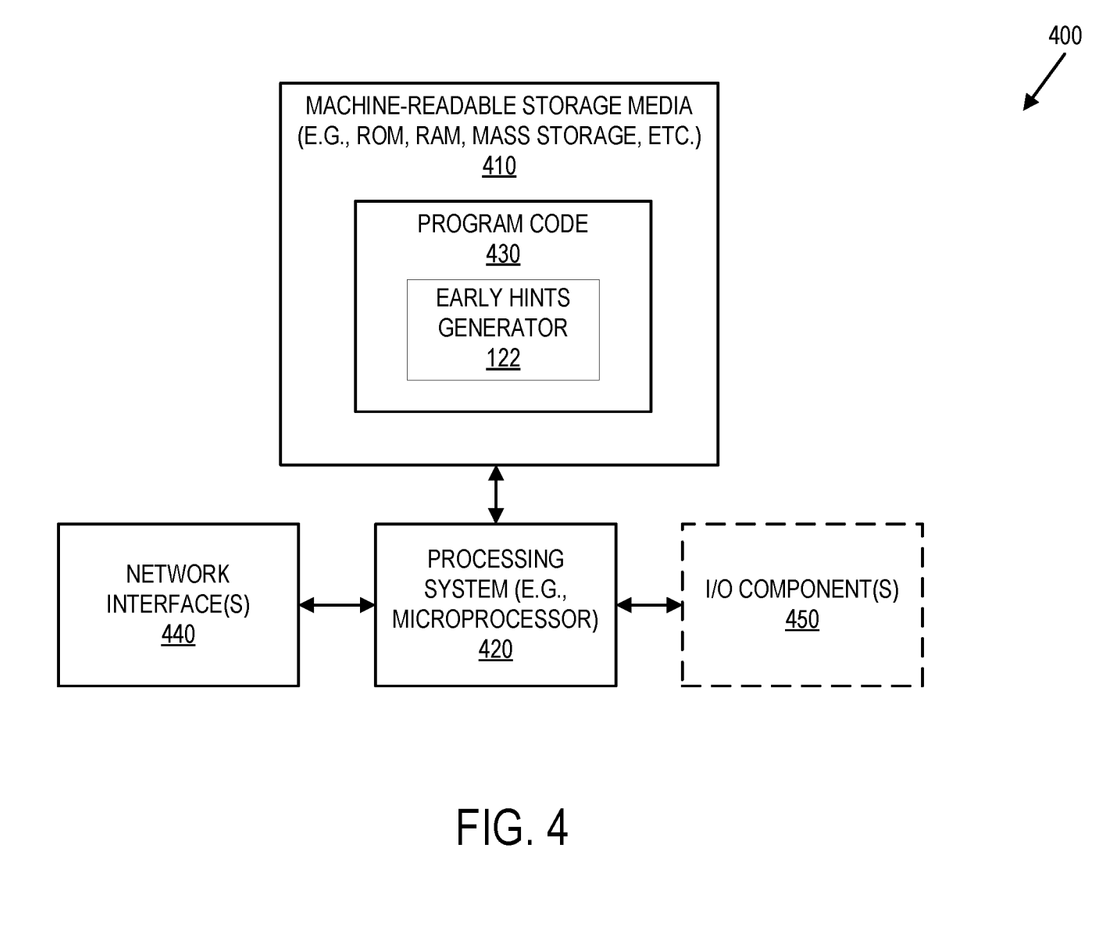
FIG. 4 is a block diagram illustrating a data processing system that can be used in an embodiment.

FIG. 4 illustrates a block diagram for an exemplary data processing system 400 that may be used in some embodiments. One or more such data processing systems 400 may be utilized to implement the embodiments and operations described with respect to the intermediary server 120. Data processing system 400 includes a processing system 420 (e.g., one or more processors and connected system components such as multiple connected chips).

The data processing system 400 is an electronic device that stores and transmits (internally and/or with other electronic devices over a network) code (which is composed of software instructions and which is sometimes referred to as computer program code or a computer program) and/or data using machine-readable media (also called computer-readable media), such as machine-readable storage media 410 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processing system 420. For example, the depicted machine-readable storage media 410 may store program code 430 that, when executed by the processor(s)

420, causes the data processing system 400 to execute the early hints generator 122, and/or any of the operations described herein.

The data processing system 400 also includes one or more network interfaces 440 (e.g., a wired and/or wireless interfaces) that allows the data processing system 400 to transmit data and receive data from other computing devices, typically across one or more networks (e.g., Local Area Networks (LANs), the Internet, etc.). The data processing system 400 may also include one or more input or output ("I/O") components 450 such as a mouse, keypad, keyboard, a touch panel or a multi-touch input panel, camera, frame grabber, optical scanner, an audio input/output subsystem (which may include a microphone and/or a speaker), other known I/O devices or a combination of such I/O devices. Additional components, not shown, may also be part of the system 400, and, in certain embodiments, fewer components than that shown in One or more buses may be used to interconnect the various components shown in FIG. 4.

The techniques shown in the figures can be implemented using code and data stored and executed on one or more electronic devices (e.g., an intermediary server). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the preceding description and the claims, the terms "coupled" and "connected," along with their derivatives, may be used. These terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:
   determining, at an intermediary server, for an asset that is handled by an origin server, one or more pieces of content for inclusion in one or more link header fields in an informational response that signifies that the one or more pieces of content are predicted to be linked within a final response for the asset;
   receiving, at the intermediary server, a request from a client, wherein the request identifies the asset;
   generating an informational response that includes one or more link header fields that reference the one or more pieces of content respectively;
   transmitting, from the intermediary server to the client, the generated informational response that includes the one or more link header fields, wherein the generated informational response is transmitted prior to a final response for the request;
   transmitting the request from the intermediary server to the origin server;
   receiving, from the origin server, a final response to the request;
   transmitting, from the intermediary server to the client, the final response to the request;
   determining, from the final response, that a piece of content that was previously predicted to be linked within the final response is not linked within the final response; and
   generating, in response to a subsequent request that identifies the asset that is handled by the origin server, an informational response that does not include a link header that references that determined piece of content that is not linked within the final response.

2. The method of claim 1, further comprising:
   wherein determining one or more pieces of content for inclusion in the one or more link header fields in an informational response to the request includes:
     retrieving the asset from the origin server; and
     parsing the asset to locate the one or more pieces of content.

3. The method of claim 1, wherein the one or more pieces of content include a link header within the asset that includes a preconnect relation, a prefetch relation, or a preload relation.

4. The method of claim 1, wherein the one or more pieces of content include a resource that is shared across a plurality of assets of a same domain.

5. The method of claim 1, wherein prior to receiving the final response to the request, retrieving the one or more pieces of content at the intermediary server.

6. The method of claim 1, wherein the origin server does not support transmission of the informational response.

7. A non-transitory medium that provides instructions that, if executed by a processor, will cause said processor to perform operations comprising, comprising:
- determining, at an intermediary server, for an asset that is handled by an origin server, one or more pieces of content for inclusion in one or more link header fields in an informational response that signifies that the one or more pieces of content are predicted to be linked within a final response for the asset;
- receiving, at the intermediary server, a request from a client, wherein the request identifies the asset;
- generating an informational response that includes one or more link header fields that reference the one or more pieces of content respectively;
- transmitting, from the intermediary server to the client, the generated informational response that includes the one or more link header fields, wherein the generated informational response is transmitted prior to a final response for the request;
- transmitting the request from the intermediary server to the origin server;
- receiving, from the origin server, a final response to the request;
- transmitting, from the intermediary server to the client, the final response to the request;
- determining, from the final response, that a piece of content that was previously predicted to be linked within the final response is not linked within the final response; and
- generating, in response to a subsequent request that identifies the asset that is handled by the origin server, an informational response that does not include a link header that references that determined piece of content that is not linked within the final response.

8. The non-transitory medium of claim 7, further comprising:
- wherein determining one or more pieces of content for inclusion in the one or more link header fields in an informational response to the request includes:
  - retrieving the asset from the origin server; and
  - parsing the asset to locate the one or more pieces of content.

9. The non-transitory medium of claim 7, wherein the one or more pieces of content include a link header within the asset that includes a preconnect relation, a prefetch relation, or a preload relation.

10. The non-transitory medium of claim 7, wherein the one or more pieces of content include a resource that is shared across a plurality of assets of a same domain.

11. The non-transitory medium of claim 7, wherein prior to receiving the final response to the request, retrieving the one or more pieces of content at the intermediary server.

12. The non-transitory medium of claim 7, wherein the origin server does not support transmission of the informational response.

13. An intermediary server, comprising:
a processor; and
a non-transitory machine-readable storage medium coupled to the processor, wherein the non-transitory machine-readable storage medium stores instructions that, when executed by the processor, causes the intermediary server to perform the following operations:
- determine for an asset that is handled by an origin server, one or more pieces of content for inclusion in one or more link header fields in an informational response that signifies that the one or more pieces of content are predicted to be linked within a final response for the asset;
- receive a request from a client, wherein the request identifies the asset;
- generate an informational response that includes one or more link header fields that reference the one or more pieces of content respectively;
- transmit, from the intermediary server to the client, the generated informational response that includes the one or more link header fields, wherein the generated informational response is transmitted prior to a final response for the request;
- transmit the request from the intermediary server to the origin server;
- receive, from the origin server, a final response to the request;
- transmit, from the intermediary server to the client, the final response to the request;
- determine, from the final response, that a piece of content that was previously predicted to be linked within the final response is not linked within the final response; and
- generate, in response to a subsequent request that identifies the asset that is handled by the origin server, an informational response that does not include a link header that references that determined piece of content that is not linked within the final response.

14. The intermediary server of claim 13, wherein the operations further comprise:
- wherein the determination of the one or more pieces of content for inclusion in the one or more link header fields in an informational response to the request includes:
  - retrieve the asset from the origin server; and
  - parse the asset to locate the one or more pieces of content.

15. The intermediary server of claim 13, wherein the one or more pieces of content include a link header within the asset that includes a preconnect relation, a prefetch relation, or a preload relation.

16. The intermediary server of claim 13, wherein the one or more pieces of content include a resource that is shared across a plurality of assets of a same domain.

17. The intermediary server of claim 13, wherein the operations further comprise: wherein prior to receiving the final response to the request, retrieve the one or more pieces of content at the intermediary server.

18. The intermediary server of claim 13, wherein the origin server does not support transmission of the informational response.

* * * * *